(12) United States Patent
Zhou et al.

(10) Patent No.: US 9,884,304 B2
(45) Date of Patent: Feb. 6, 2018

(54) IMMERSION FIXED BED REACTOR INTENSIFIED BY LIQUID FLOW

(75) Inventors: Zheng Zhou, Nanjing (CN); Zhibing Zhang, Nanjing (CN); Gaodong Yang, Nanjing (CN); Yue Dai, Nanjing (CN); Pingkeng Wu, Nanjing (CN); Xiaojuan Liu, Jiangsu (CN)

(73) Assignee: NANJING UNIVERSITY (CN)

( * ) Notice: Subject to any disclaimer, the term of this patent is extended or adjusted under 35 U.S.C. 154(b) by 906 days.

(21) Appl. No.: 14/361,572

(22) PCT Filed: May 25, 2012

(86) PCT No.: PCT/CN2012/076054
§ 371 (c)(1),
(2), (4) Date: Aug. 27, 2014

(87) PCT Pub. No.: WO2013/086837
PCT Pub. Date: Jun. 20, 2013

(65) Prior Publication Data
US 2014/0369892 A1    Dec. 18, 2014

(30) Foreign Application Priority Data
Dec. 16, 2011   (CN) .......................... 2011 1 0422157

(51) Int. Cl.
*B01J 8/00*    (2006.01)
*B01J 8/02*    (2006.01)
(Continued)

(52) U.S. Cl.
CPC .............. *B01J 8/067* (2013.01); *B01J 8/008* (2013.01); *B01J 8/0214* (2013.01); *B01J 8/0278* (2013.01);
(Continued)

(58) Field of Classification Search
CPC ....... B01J 8/00; B01J 8/008; B01J 8/02; B01J 8/0207; B01J 8/0214; B01J 8/0278;
(Continued)

(56) References Cited

U.S. PATENT DOCUMENTS 2,968,610 A    1/1961 Bergstrom
4,180,543 A * 12/1979 Ward ..................... B01J 8/0005
422/148

(Continued)

FOREIGN PATENT DOCUMENTS

CN          1546217 A    11/2004
CN        101172922 A     5/2008
WO    WO 2012/146903 A1 * 11/2012

OTHER PUBLICATIONS

International Search Report; PCT/CN2012/076054; International File Date: May 25, 2012; Nanjing University 2 pgs.

*Primary Examiner* — Natasha Young
(74) *Attorney, Agent, or Firm* — Schmeiser, Olsen & Watts, LLP

(57) ABSTRACT

An immersion fixed bed reactor intensified by liquid flow contains a cylindrical tank internally installed with an annular cylindrical catalyst bed (ACCB) packed with solid catalysts is provided. The inner and outer walls of the ACCB are composed of two layers of stainless steel sheets with holes. The outer layer of stainless steel perforated with holes. The inner layer of catalyst contacting stainless steel is covered with stainless steel waved mesh in circumferential direction. The bottom of AACB is sealed with a steel plate by welding or a blind plate and the top of ACCB is fixed to cylindrical tank with a flange. The solid catalysts are packed in the ACCB.

11 Claims, 3 Drawing Sheets

(51) Int. Cl.
  *B01J 8/06* (2006.01)
  *B01J 8/20* (2006.01)
  *B01J 8/22* (2006.01)
  *B01J 19/00* (2006.01)
  *B01J 19/02* (2006.01)
  *B01J 19/24* (2006.01)
  *B01J 19/30* (2006.01)
  *B01J 19/32* (2006.01)

(52) U.S. Cl.
  CPC ............... *B01J 8/228* (2013.01); *B01J 19/02* (2013.01); *B01J 2208/00176* (2013.01); *B01J 2208/00283* (2013.01); *B01J 2208/00884* (2013.01); *B01J 2208/00902* (2013.01); *B01J 2208/065* (2013.01); *B01J 2219/0286* (2013.01)

(58) Field of Classification Search
  CPC ....... B01J 8/06; B01J 8/067; B01J 8/20; B01J 8/22; B01J 8/224; B01J 8/228; B01J 19/00; B01J 19/02; B01J 19/24; B01J 19/30; B01J 19/305; B01J 19/32; B01J 19/325; B01J 2208/00–2208/00017; B01J 2208/00106; B01J 2208/00168; B01J 2208/00176; B01J 2208/00265; B01J 2208/00283; B01J 2208/00796; B01J 2208/00884; B01J 2208/00893; B01J 2208/00902; B01J 2208/065; B01J 2219/02; B01J 2219/0204; B01J 2219/0277; B01J 2219/0286

See application file for complete search history.

(56) References Cited

U.S. PATENT DOCUMENTS

| | | |
|---|---|---|
| 4,244,922 A | 1/1981 | Burke et al. |
| 5,202,097 A | 4/1993 | Poussin |

\* cited by examiner

IMMERSION FIXED BED REACTOR INTENSIFIED BY LIQUID FLOW

CROSS-REFERENCE TO RELATED APPLICATIONS

This application claims priority to PCT Application No. PCT/CN2012/076054, now WO 2013/086837, having a filing date of May 25, 2012, based off of CN Application No. 201110422157.X, having a filing date of Dec. 16, 2011, the entire contents of which are hereby incorporated by reference.

FIELD OF TECHNOLOGY

The following relates to an immersion fixed bed reactor intensified by liquid flow.

BACKGROUND

Chemical reactors are often used in the synthesis of new products in chemical, petrochemical, pharmaceutical, food and other industries. There are many types of chemical reactors, which can be divided into batch reactors, continuous reactors and semi-batch reactors based on operation modes; plug flow reactors, ideal mixing reactors and non-ideal reactors based on fluid flowing and mixing modes. At present, fixed bed reactors, stirred tank reactors, fluidized bed reactors and jet reactors etc. are mostly employed in chemical reaction processes. Fixed bed reactors are widely accepted due to their simple structure and fixed catalyst. However, some defects of them limit their use more widely: poor heat transfer performance, difficult to replace the catalyst during operation and control secondary reaction, low reaction rate and productivity, long reaction time and high cost etc. Also, jet reactors have defects, such as strong collisions between catalysts and catalysts, catalysts and internals of reactor as the result of the force of liquid flow. The consequence is that solid catalyst particles especially those of particulated catalysts such as sulfonic acid type ion exchange resin are easily broken, thus gradually becoming inactivate and affecting their service life.

SUMMARY

An aspect relates to solving the shortcomings in the performance of the above-described conventional fixed bed reactors (CFBR) and conventional jet reactors (CJR), and to provide a novel immersion fixed bed reactor (IFBR) intensified by liquid flow, suitable for two-phase or three-phase reaction systems including liquid-solid system (liquid phase is reaction mass, and solid phase is catalyst), gas-liquid-solid system (gas-liquid phase is reactants, and solid phase is catalysts) and liquid-liquid-solid system (two liquid phase reactants, solid phase catalyst).

The aspects of the present invention are as follows:

A immersion fixed bed reactor (IFBR) intensified by liquid flow is equipped with a cylindrical tank R-1 internally installed with an annular cylindrical catalyst bed (ACCB) T-1 packed with solid catalysts, as shown in FIG. 1. The inner and outer walls of the ACCB T-1 are composed of two layers of stainless steel sheets with holes. The outer layer of stainless steel is 3-20 mm thick and is perforated with diameter of 3-10 mm holes. The inner layer of catalyst contacting stainless steel is 0.1-3 mm thick and is covered with stainless steel waved mesh in circumferential direction and the distance between peak and valley is 3-20 mm, preferably 5-12 mm. The top and bottom of the ACCB T-1 are sealed with circular blind plates, and the solid catalysts are packed in the space between the inner and outer walls of T1. The cylindrical tank R-1 is equipped with a reaction mass inlet duct 1 at the top and mass outlet duct 2 at the bottom and the duct 2 is connected with the liquid circulating pump P-1, liquid outlet duct valve V-1, flow meter L-1, heat exchanger E-1 and normal tube inlet M-1 inserting into the central column space of T-1 at axial position through the top of R-1 and enables the liquid pumped from P-1 into the central column space of T-1 and radically pass through the catalyst bed of T-1 into the space between R-1 and T-1, thus one cycle of reaction operation is accomplished. With the continuous work of the pump P-1 the liquid in R-1 will be repeatedly circulated and the reaction is simultaneously carried out again and again.

An IFBR by liquid flow described above, the ACCB T-1 is fixed with the wall of cylindrical tank R-1 via bolts and lugs, so as to be easily dismantled and removed from cylindrical tank R-1 for the alteration of catalyst.

An IFBR intensified by liquid flow described above, the distance of the inner and outer walls of the ACCB T-1 is 10-10,00 mm, preferably 50-500 mm.

An IFBR intensified by liquid flow described above, the top blind plate of the ACCB T-1 can be connected with flanges, and solid catalysts can be added into T-1 after the demolition of the flanges; the bottom blind plate of the ACCB T-1 can be connected with flanges or by welding.

An IFBR intensified by liquid flow described above, the hole area of the outer layer of the inner and outer walls of the ACCB T-1 is 50%-95%, and the layer of stainless-steel sheet supports the inner layer of stainless steel waved mesh; the hole area of the inner wavy stainless steel mesh is 60-90%, smaller than the outer layer hole area, and this layer is to block the leakage of solid catalyst particles.

An IFBR intensified by liquid flow described above, if it is gas-liquid-solid reaction system, the above-stated normal tube inlet M-1 will be substituted by a jet inlet M-2, as shown in FIG. 6, which has a vacuum inlet 12 allowing the surrounding gas or mass vapor sucked and mixed with the liquid into the central column space of T-2, then radially flows together with liquid reactants through the catalyst bed of T-2 into the annular space between R-2 and T-2.

The vacuum inlet 12 of the jet inlet M-2 is connected to the outlet 13 of the R-2 and the gas reactant is added through the gas inlet 7 and the distributor S-1.

The present invention runs as below:

When it deals with two-phase reaction system or three-phase reaction system such as liquid-solid and liquid-liquid-solid, the process are shown in FIG. 1: the liquid reactants are added into R-1 through duct land circulated by the pump P-1. The liquid flow rate is adjusted by the flow meter L-1 and the liquid is heated by heat exchanger E-1. Then the fluid is pressed into the central column space of T-1 through M-1, which functions to continuously transmit the fluid to the central column space of T-1 from the bottom of the R-1, and is forced radically passing the catalyst bed from the central column space of T-1 to the annular space between R-land T-1. Meanwhile, chemical reactions take place. After one-cycle accomplishment of the reaction the mixture is recycled by the circulation pump P-1 to carry out the next reaction cycle, and so forth.

When it deals with gas-liquid-solid reaction system the process is shown in FIG. 6. The liquid reactants are added into R-2 through the duct 6 and circulated by the pump P-2. The gas reactants are added into R-2 through the duct 7 and distributed by the distributor S-1. The liquid flow rate is adjusted by the flow meter L-2 and the liquid is heated by the heat exchanger E-2. Then the fluid is pressed into the central column space of T-2 through the jet inlet M-2, which functions to transmit the fluid continuously to the central column space of T-2 from the bottom of R-2 and generate a vacuum. When the jet inlet M-2 works the vacuum will be simultaneously created and allow the surrounding gas or mass vapor in the space of the top of R-2 sucked into the vacuum room of M-2 through the outlet 13. And it will mix with the liquid phase and flows together into the central column space of T-2. Then the mixture is forced radially to pass the catalyst bed from the central column space of T-2 to the annular space between R-2 and T-2. Meanwhile, chemical reactions take place. After one-cycle accomplishment of the reaction, the liquid mixture is recycled by the circulation pump P-2 and the unreacted gas gathering to the top of R-2 is resucked into the vacuum room of M-2 through the outlet 13 and the inlet 12, to carry out the next reaction cycle, and so forth.

Statistically, within the average reactor residence time the fluid will be forced to pass through the catalyst bed for dozens or even hundreds of times. Therefore the reaction process is significantly intensified either in reaction speed or in energy efficiency comparing with that of the CFBR. In addition, since the catalyst is firmly fixed inside the ACCB and immersed in the liquid, there's no damage of the catalyst, Therefore, its service life is almost the same as that of the CFBR. It shows that this novel reactor has the advantages of both a fixed bed reactor and a jet reactor, but without their shortcomings.

This invention can be used in both batch operation and continuous operation. In continuous operation, it only needs continuously to add the reactants into the reactor while the reaction product is constantly transmitted via the circulation pump, in addition to maintaining the mass residence time in the reactor and the proper liquid level.

When the reaction is carried out for a certain time, the reaction mass outputs through valve V-6 and enters into the separation unit.

The advantages of the present invention can be described as below:

(1) In the present invention, the ACCB is packed with solid catalyst, avoiding catalyst damage caused by collision and effectively improving the life of the catalyst.

(2) The diameters of the holes of the two layer steel walls at the sides of the ACCB are different from each other, which prevents the catalyst from entering into the liquid and also increases the mechanical strength to prevent the cylindrical annulus from being deformed due to the liquid pressure.

(3) In the ACCB, the bored steel plate close to catalyst is wavy, as shown in FIG. 5, which can greatly increase the surface area so that the resistance encountered when the liquid flows through the wire is reduced.

(4) In the present invention, the mass is continuously circulated in the forced circulation system and pumped out through the sides of the cylindrical annulus, so that the mixing in the whole system is uniform and the temperature runaway problem occurred in the traditional fixed bed can be avoided.

(5) In the present invention, the cylindrical annulus and the reactor wall are fixed with screws and removable, so it is easy to replace the catalyst.

BRIEF DESCRIPTION

DETAILED DESCRIPTION

Example 1: (Liquid-Liquid-Solid Three Phase Reaction System)

Figure 1:
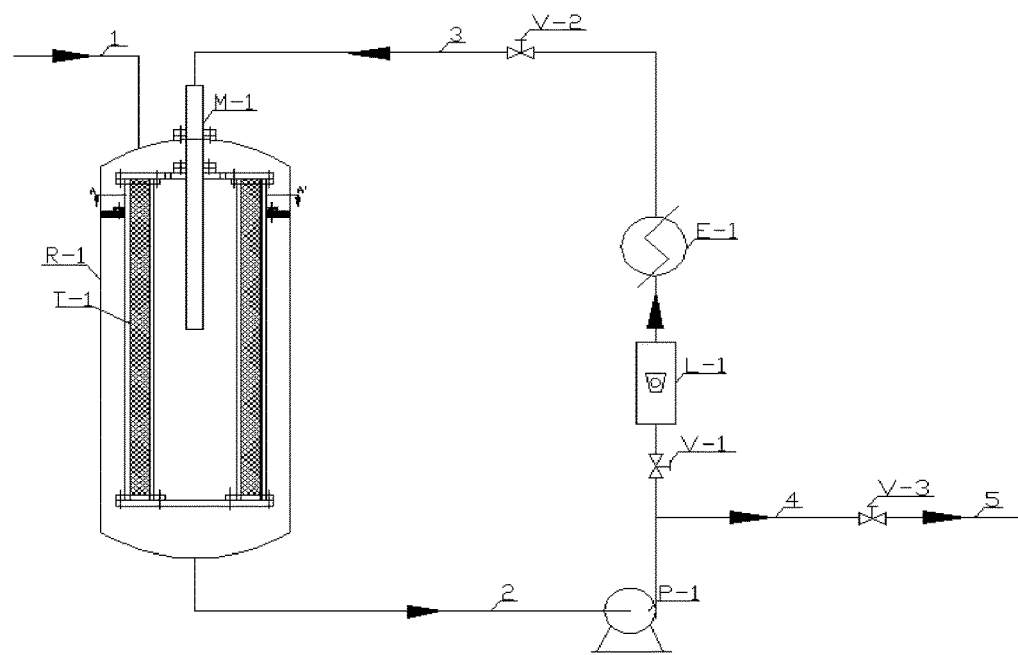
FIG. 1 is a schematic diagram of the invented IFBR used for liquid-solid two phase or liquid-liquid-solid three phase reaction. wherein: R-1 cylindrical tank, T-1 annular cylindrical catalyst bed (ACCB), M-1 normal tube inlet, L-1 liquid flow meter, P-1 liquid circulating pump, E-1 heat exchanger, V-1, V-2 and V-3 valves, and 1, 2, 3, 4 and 5 tubes.

Dihydro-myrcene, water and acetone solvent were mixed at a mass ratio of 1:1:2, and the mixture entered via duct 1 into the cylindrical tank R-1 of the IFBR (FIG. 1). The volume of the cylindrical tank was 10 $m^3$, and the aspect ratio was 3:1. Fill the ACCB T-1 with the solid catalyst Amberlyst 15 (Rohm and Haas, USA). The outer diameter of T-1 was 1.6 m, inner diameter was 1.0 m, the height was 4.8 m; the outer steel plate of the side wall was 12 mm thick and the hole diameter is 8 mm, and the hole surface area accounts for 95%. The inner steel plate of the side wall was 3 mm thick with the hole diameter of 0.5 mm and appeared wavy in circumferential direction with a distance of 10 mm between peak and valley. Start circulation pump P-1, and the mass was pumped through valve V1, flow meter and heat exchanger E-1, respectively, into the central column space of T-1 through M-1 and then into cylindrical tank R-1 radically through the catalyst bed. After 45 minutes of circulation of the liquid, the valve V-3 was opened for discharge, and the mixture was pumped into the subsequent section for separation. Simultaneously, new mass was supplemented to the reactor through duct 1 so as to ensure the mass conservation in the system. In this hydration process, dihydro-myrcene conversion rate was up to 29%, and the selectivity was over 90.6%.

Example 2: (Liquid-Liquid-Solid Three Phase Reaction System)

The reactor and the method used herein were similar to Example 1. Dihydro-myrcene, water and acetone solvent was 1:1.15:2.2 in mass ratio, and the reaction temperature was 98° C., the solid catalyst was Amberlyst 35 (Rohm and Haas, USA). The volume of cylindrical tank R-1 was 6 $m^3$, and the aspect ratio was 2:1. The outer diameter of the ACCB T-1 was 1.2 m and the inner diameter 0.86 m with the height of 2.4 m; the outer steel plate of the side wall was 6 mm thick with the hole diameter of 8 mm and the hole surface area of 90%. The inner steel plate of the side wall was 2 mm thick with the hole diameter of 0.8 mm and appeared wavy in circumferential direction with a distance of 8 mm between peak and valley. After 55 minutes of circulation of the liquid, the valve V-3 was opened for discharge, and the mixture was pumped into the subsequent section for separation. Simultaneously, new mass was supplemented to the reactor through duct 1, so as to ensure the mass conservation in the system. In this process, dihydro-myrcene conversion rate was up to 33.5%, and selectivity was over 91.2%.

Example 3: (Liquid-Liquid-Solid Three Phase Reaction System)

This invention used herein was similar to Example 1. The molar ratio of acetate and n-butanol was 2:1, and the reaction temperature was 85° C., the solid catalyst was Amberlyst 15 (Rohm and Haas, USA). The volume of cylindrical tank R-1 was 3 m$^3$, and the aspect ratio was 1.8:1. The outer diameter of the ACCB T-1 was 1 m and the inner diameter 0.78 m with the height of 2 m. The outer steel plate of the side wall was 10 mm thick with the hole diameter of 8 mm and the hole surface area of 90%. The inner steel plate of the side wall was 2 mm thick with the hole diameter of 0.5 mm and the hole surface area of 85%. It appeared wavy in circumferential direction with a distance of 6 mm between peak and valley. After 30 minutes of circulation of the liquid, the valve V-3 was opened for discharge, and the mixture was pumped into the subsequent section for separation. Simultaneously, new mass was supplemented to the reactor through duct 1 so as to ensure the mass conservation in the system. In this process, n-butanol conversion rate was up to 32.6%, and selectivity was up to 100%.

Example 4: (Gas-Liquid-Solid Phase Reaction System)

Figure 2:
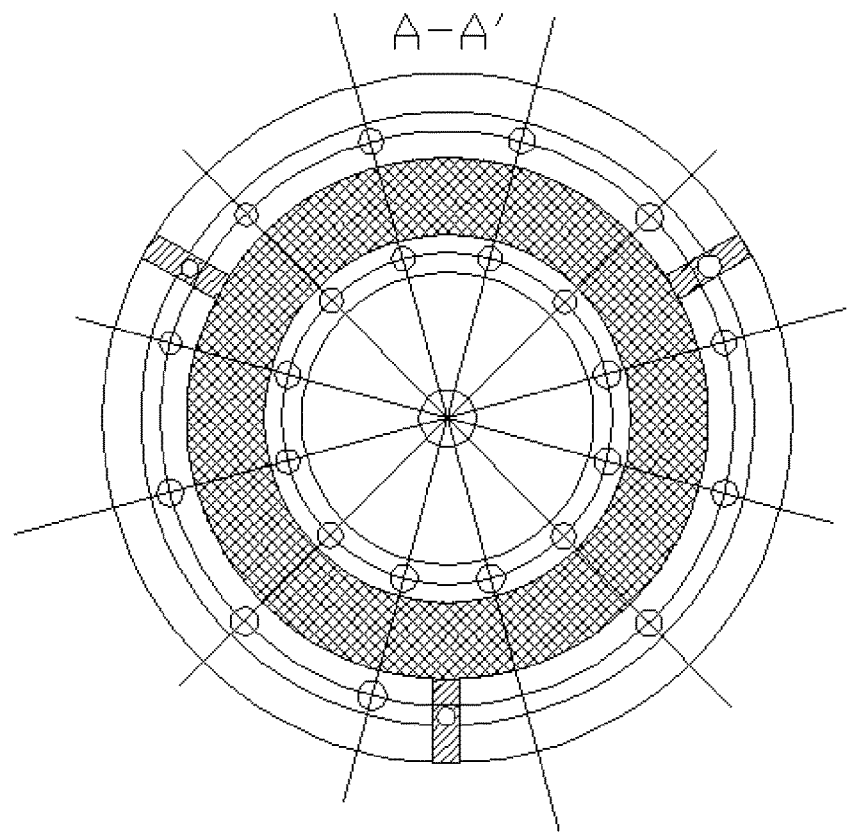
FIG. 2 is an A-A' plan view of FIG. 1.
Figure 3:
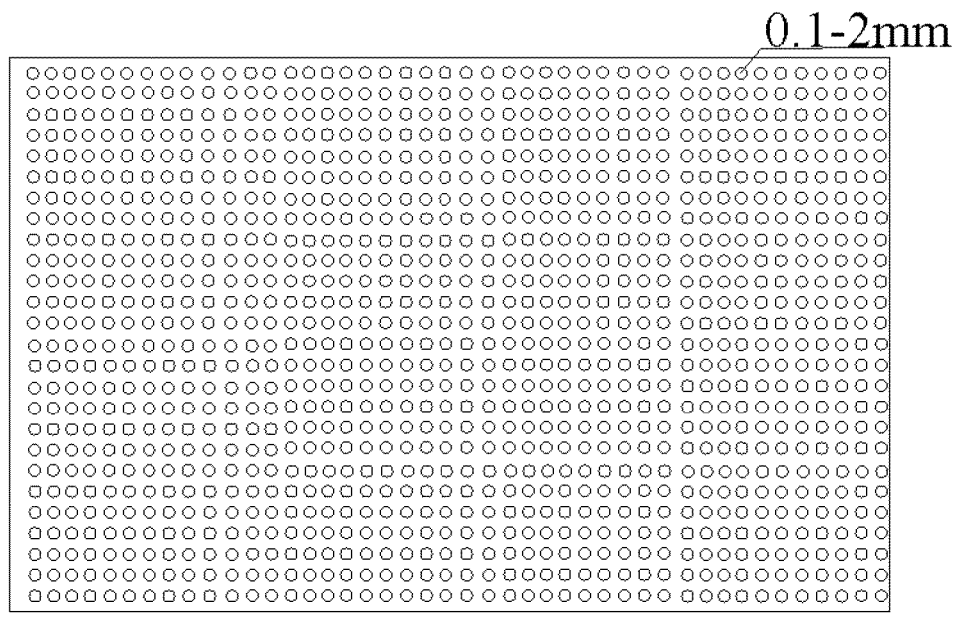
FIG. 3 is a schematic view of the inner stainless steel plate of the side wall of the ACCB T-1.
Figure 4:
FIG. 4 is a plan view of the two-layer stainless steel plate of the side wall of the ACCB T-1.
Figure 5:
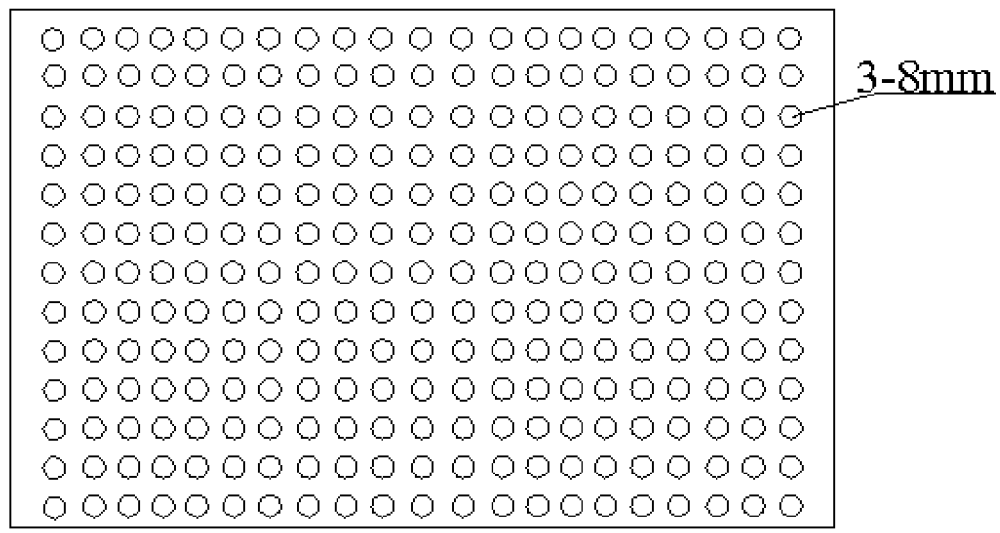
FIG. 5 is a plan view of the outer stainless steel plate of the side wall of the ACCB T-1.
Figure 6:
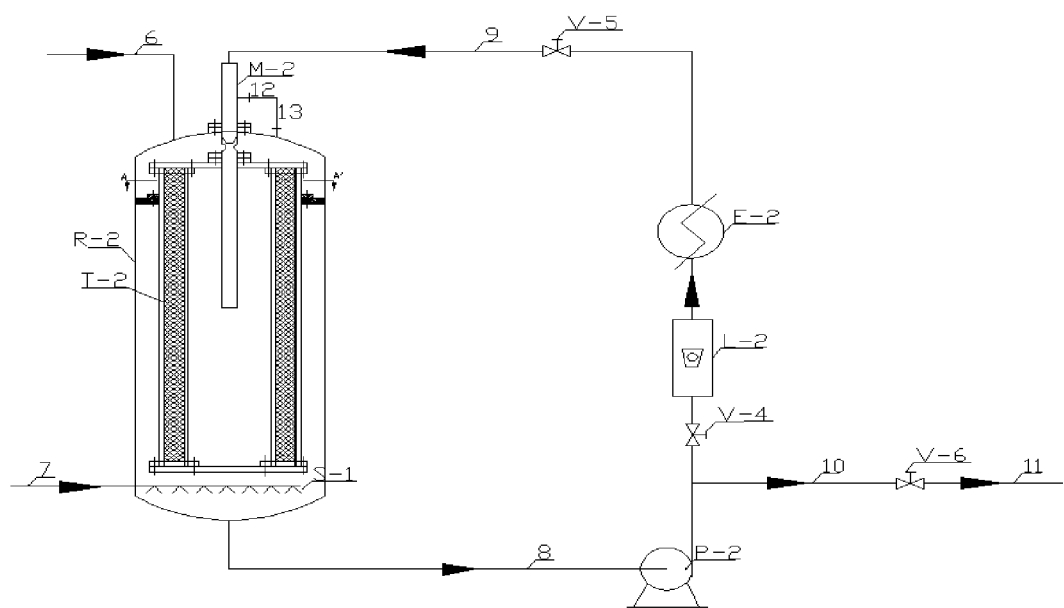
FIG. 6 is a schematic diagram of the invented IFBR used for gas-liquid-solid three phase reaction, wherein: R-2 cylindrical tank, T-2 ACCB, M-2 Jet, L-2 liquid flow meter, P-2 liquid circulating pump, E-2 heat exchanger, V-4, V-5 and V-6 valves, and 1, 2, 3, 4 and 5 tubes.

The molar ratio of acetic acid and butene was 1:1.1. Acetic acid entered via duct 6 into cylindrical tank R-2 of the IFBR (FIG. 2). Butene entered via duct 7 and gas distributor S-1 into cylindrical tank R-2, the reaction temperature was 102° C., and the pressure was 0.8 MPa (gauge pressure). Fill the ACCB T-2 with the solid catalyst NKC-9 (Nankai University Catalyst Co., Ltd.).

The volume of cylindrical tank R-2 was 10 m$^3$ equipped a jet M-2, and other structural parameters of the reactor were the same as those of Example 1. Start circulation pump P-2, the mass was lifted through valve V4, flow meter L-2 and heat exchanger E-2, respectively, and then injected into the central column space of T-2 through the jet M-2, in which butane (gas) was sucked in through the pipe 12 and the pipe 13. The liquid-gas mixture in the central column space of T-2 was forced to enter into cylindrical tank R-2 radically through the catalyst bed. After 20 minutes of circulation, the valve V-6 was opened for discharge, and the mixture of liquid was pumped into the subsequent section for separation. Simultaneously, acetic acid was supplemented to the reactor both from the raw material tank and those of the recovery tank separated from the subsequent section through duct 6, and butane was added through duct 7 and S-1 according to the pressure of the reactor, so as to ensure the mass conservation in the reaction system. In this process, butene conversion rate can be up to 91.4%.

Example 5: (Gas-Liquid-Solid Phase Reaction System)

The molar ratio of acetic acid and butene was 1:1.2. Acetic acid entered via duct 6 into cylindrical tank R-2 of the IFBR (FIG. 2). Butene entered via duct 7 and gas distributor S-1 into cylindrical tank R-2, the reaction temperature was 98° C., and the pressure was 0.6 MPa (gauge pressure). Fill the ACCB T-2 with the solid catalyst Amberlyst 35.

The volume of cylindrical tank R-2 was 10 m$^3$ equipped a jet M-2, and other structural parameters of the reactor were the same as those of Example 1. Start circulation pump P-2, the mass was lifted through valve V4, flow meter L-2 and heat exchanger E-2, respectively, and then injected into the central column space of T-2 through the jet M-2, in which butane (gas) was lifted sucked in through the pipe 12 and the pipe 13. The liquid-gas mixture in the central column space of T-2 was forced to enter into cylindrical tank R-2 radically through the catalyst bed. After 35 minutes of circulation, the valve V-6 was opened for discharge, and the mixture of liquid was pumped into the subsequent section. Simultaneously, acetic acid was supplemented to the reactor both from the raw material tank and those of the recovery tank separated from the subsequent section through duct 6, and butane was added through duct 7 and S-1 according to the pressure of the reactor, so as to ensure the mass conservation in the reaction system. In this process, butene conversion rate was up to 91.4%.

The invention claimed is:

1. An immersion fixed bed reactor intensified by liquid flow, comprising:
   a cylindrical tank internally installed with an annular cylindrical catalyst bed (ACCB) packed with solid catalysts, the ACCB including an inner wall and an outer wall that are composed of two layers of stainless steel sheets with a plurality of holes, the outer layer of stainless steel is 3-20 mm thick and is perforated with diameter of 3-10 mm holes, the inner layer of catalyst contacting stainless steel is 0.1-3 mm thick and is covered with a stainless steel waved mesh in a circumferential direction and a distance between peak and valley is 3-20 mm, a top and a bottom of the ACCB being sealed with circular blind plates, and the solid catalysts are packed in a space between the inner wall and outer walls of the ACCB,
   wherein the cylindrical tank is equipped with a reaction mass inlet duct at a top and a mass outlet duct at a bottom and the mass outlet duct is connected with a liquid circulating pump, a liquid outlet duct valve, a flow meter, a heat exchanger and a normal tube inlet inserting into a central column space of the ACCB at an axial position through the top of the ACCB, and enables the liquid is pumped by the liquid circulating pump into the central column space of the ACCB and radically pass through the catalyst bed of the ACCB into a space between the cylindrical tank and the ACCB.

2. The immersion fixed bed reactor intensified by liquid flow according to claim 1, wherein the distance between peak and valley of the inner steel plate wave of the ACCB is 3-12 mm.

3. The immersion fixed bed reactor intensified by liquid flow according to claim 1, wherein the ACCB is connected with the inner wall of cylindrical tank via bolts and lugs, so as to be easily dismantled and removed from cylindrical tank for the alteration of catalyst.

4. The immersion fixed bed reactor intensified by liquid flow according to claim 1, wherein the distance of the inner wall and the outer walls of the ACCB is 10-10.00 mm.

5. The immersion fixed bed reactor intensified by liquid flow according to claim 1, wherein the distance of the inner wall and outer walls of the ACCB is 30-50 mm.

6. The immersion fixed bed reactor intensified by liquid flow according to claim 1, wherein the top blind plate of the ACCB is connected with flanges, and the bottom blind plate of the ACCB is connected with flanges or by welding.

7. The immersion fixed bed reactor intensified by liquid flow according to claim 1, wherein the area of the outer layer of the inner and outer walls of the ACCB is 50%-95%, and the layer of stainless-steel sheet supports the inner layer of stainless steel waved mesh, the whole area of the inner wavy stainless steel mesh is 60-90%, smaller than the outer layer area, and this layer is to block the leakage of solid catalyst particles.

8. The immersion fixed bed reactor intensified by liquid flow according to claim 1, wherein if it is gas-liquid-solid reaction system, the normal tube inlet is substituted by a jet inlet, which has a vacuum inlet allowing the surrounding gas or mass vapor sucked and mixed with the liquid into the central column space of the ACCB, then radially flows together with liquid reactants through the catalyst bed of the ACCB into the annular space between the cylindrical tank and the ACCB.

9. The immersion fixed bed reactor intensified by liquid flow according to claim 8, wherein the vacuum inlet of the jet inlet is connected to the outlet of the cylindrical tank and the gas reactant is added through the gas inlet and the gas distributor.

10. The immersion fixed bed reactor intensified by liquid flow according to claim 1, wherein the distance between peak and valley is 5-12 mm.

11. The immersion fixed bed reactor intensified by liquid flow according to claim 4, wherein the distance of the inner wall and the outer walls of the ACCB is 50-500 mm.

* * * * *